Aug. 2, 1938.  J. HUBERT  2,125,638

CLOCKWORK MOVEMENT

Filed Jan. 6, 1933  6 Sheets-Sheet 1

INVENTOR.
Jean Hubert
BY Cornelius Zabriskie
ATTORNEY.

Aug. 2, 1938.   J. HUBERT   2,125,638
CLOCKWORK MOVEMENT
Filed Jan. 6, 1933   6 Sheets-Sheet 2

INVENTOR.
Jean Hubert
BY Cornelius Zabriskie
ATTORNEY.

Aug. 2, 1938.　　　　　J. HUBERT　　　　　2,125,638
CLOCKWORK MOVEMENT
Filed Jan. 6, 1933　　　　6 Sheets-Sheet 3

INVENTOR.
Jean Hubert
BY Cornelius Zabriskie
ATTORNEY.

Aug. 2, 1938.     J. HUBERT     2,125,638
CLOCKWORK MOVEMENT
Filed Jan. 6, 1933      6 Sheets-Sheet 4

INVENTOR.
Jean Hubert
BY Cornelius Zabriskie
ATTORNEY.

Aug. 2, 1938.     J. HUBERT     2,125,638
CLOCKWORK MOVEMENT
Filed Jan. 6, 1933     6 Sheets-Sheet 5

INVENTOR.
Jean Hubert
BY Cornelius Zabriskie
ATTORNEY.

Aug. 2, 1938.  J. HUBERT  2,125,638
CLOCKWORK MOVEMENT
Filed Jan. 6, 1933  6 Sheets-Sheet 6

INVENTOR.
Jean Hubert
BY Cornelius Zabriskie
ATTORNEY.

Patented Aug. 2, 1938

2,125,638

UNITED STATES PATENT OFFICE 2,125,638

CLOCKWORK MOVEMENT

Jean Hubert, Paris, France, assignor to Jean Delviniotti, Paris, France

Application January 6, 1933, Serial No. 650,531
In Belgium January 7, 1932

25 Claims. (Cl. 58—28)

The present invention concerns a clockwork movement comprising a circular balance and electric means for maintaining the motion thereof.

The object of the present invention is to provide an electric clockwork movement of small volume and of simple construction adapted to be used for timekeepers of small size (which will hereinafter be referred to as "watches", or "timepieces", without giving any limitative meaning to these words) and which can be applied to all kinds of timekeepers, from very small to very big clocks.

The clockwork movement according to the present invention comprises, a driving balance, of small thickness, made of a non magnetic material and carrying a mass of a magnetic metal, for instance soft iron, and two stationary coils, also of small thickness, having a metallic core. The balance and the coils are so disposed with respect to one another that, in the position of equilibrium of the balance, the contact or contacts that produce the closing of the energizing circuit is, or are, open. In that way, although the iron mass of the balance closes, in its position of equilibrium, the magnetic circuit of the coils, no magnetic force is produced, unless there is a remanence of the metal, which is negligible for practical purposes.

Preferred embodiments of my invention will be hereinafter described, with reference to the accompanying drawings, given merely by way of example, and in which.

Figure 1:
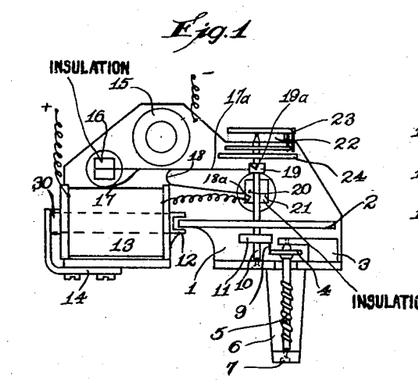
Figs. 1 and 2 show a time-piece clockwork movement according to the present invention, in elevational view and in plan view respectively.
Figure 2:
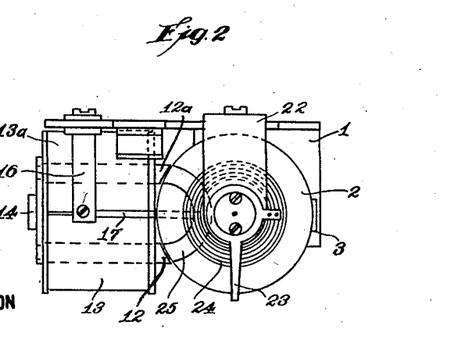

According to the embodiment of my invention shown in Figs. 1 and 2, the device for maintaining the motion comprises, as above explained, a circular balance 2 carrying a soft iron armature 25, and two coils 13 and 13a provided with soft iron cores 12 and 12a disposed in the same plane as the balance, so that in the position of equilibrium of the balance, the coils are symmetrically disposed with reference to the mass of iron 25 of the balance (Fig. 2).

On the other hand, in that position of equilibrium, the contact or contacts are open; and the impulses, which maintain the motion of the balance, take place, either symmetrically or not, in one or both directions, before the position of equilibrium.

To this effect, the balance carries two pallets 19a, 19b, provided on a sleeve 19 which is disposed coaxially with the balance and is electrically connected with the clockwork. Said pallets are intended to come into contact with the end 17a of an arm 17 carried by a pillar 16 insulated from the supporting plate of the clockwork. These two pallets are inclined, as shown in Figs. 3b, 4b, 5b, 6b and 7b, which represent developments of piece 19 with its pallets and the end 17a of arm 17 in five different positions of the balance respectively.

On the other hand, arm 17 carries a flexible blade 18 the end of which is provided with a contact 18a for closing the energizing circuit through its contact with stud 20 carried by a pillar 21 insulated from the supporting plate of the clockwork.

Figures 3, 3B:
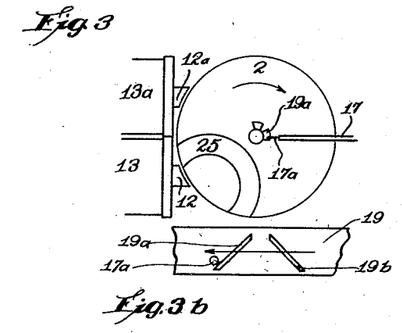
Figs. 3, 4, 5, 6 and 7 show the contacts in several positions of the operation of the device, and the corresponding positions of the balance.
Figures 3b, 4b, 5b, 6b and 7b are fragmental development views showing the relation between the cams and spring arms of Figures 3, 4, 5, 6 and 7, respectively.
Figure 3A:
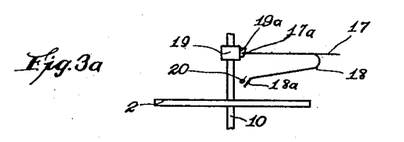
Figures 3a, 4a, 5a, 6a and 7a are side elevations of the balance and contact structures, as shown in Figs. 3, 4, 5, 6 and 7, respectively.
Figures 4, 4B:
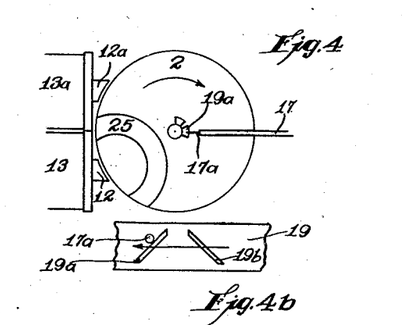
Figure 4A:
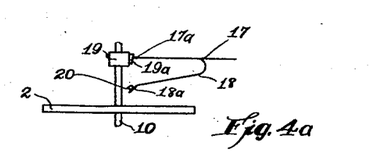

Thus, referring, for instance to Fig. 3, it will be seen that when contact 19a, 17a is made; balance 2, under the action of its inertia, moves in the direction of the arrow, the energizing circuit still not being closed. In the course of that displacement, pallet 19a, made of a suitable metal, raises arm 17 through its extremity made of a suitable metal, so as to bring it into the position shown in Fig. 4. Flexible blade 18, which is integral with arm 17, also moves in an upward direction and contacts 18a—20, made of a suitable metal, are brought together. Balance 2 then moves in the direction of the arrow of Fig. 4, its mass of iron being acted upon by the electro-magnetic force of the two coils 13, 13a, the energizing circuit being closed as follows: negative terminal of the source of current, mass of the clockwork, 19, 19a, 17a, 17, 18, 18a, 20, coils 13 and 13a, positive terminal of the source of current, or the reverse. In the foregoing operation, the parts 17 and 18, with their respective contacts 17a and 18a, serve as a current carrying bridge to complete the circuit between the contacts 19a and 20.

Figure 5:
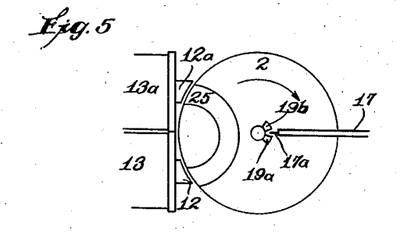
Figure 5A:
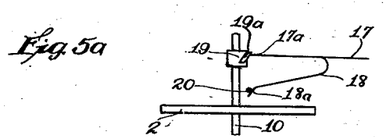
Figure 5B:
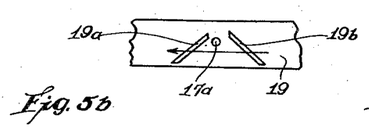
Figure 6:
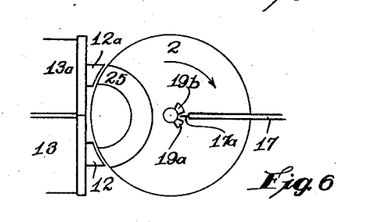
Figure 6A:
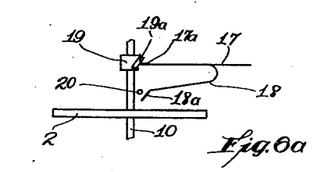
Figure 6B:
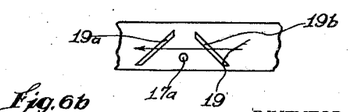

When balance 2 is in its position of equilibrium, (Fig. 5) contact 17a is released from pallet 19a and arm 17, on coming back to its original position, in turn moves contacts 18a away from 20 (Fig. 6).

Figure 7:
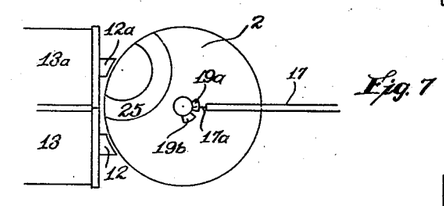
Figure 7A:
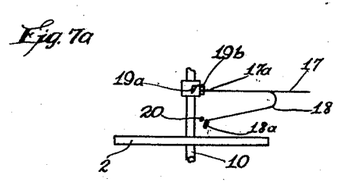
Figure 7B:
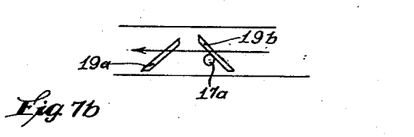

As balance 2 further moves under the action of its inertia, as shown in Fig. 7, contact 17a is brought against the back of pallet 19b and the inclined plane of said pallet moves in a downward direction arm 17 and flexible blade 18, which subsequently assume a position symmetrical with that shown in Fig. 3, so that the contact is made at 17a—19b instead of 17a—19a.

That position makes it possible to have, on the return motion of the balance, the same operation, but now in the reverse order, as that above described.

It follows from the preceding explanation that the closing of the electric circuit takes place through contacts 18a—20, and that the opening is produced through contacts 17a—19a or 17a—19b according to the direction of the motion of the balance.

It also follows that the impulses which maintain the motion of the balance take place in one or both directions before the position of equilibrium of the balance for when the balance is moving in the direction indicated in Figs. 3-6, the pallet 19a acts upon the contact 17a as the balance approaches its position of equilibrium, indicated in Fig. 5, and closes the circuit to the electromagnet to permit of the momentary impulse of current. Nevertheless by the time the balance arrives at the position of Fig. 5, the circuit has been broken again because the pallet 19a moves beyond the contact 17a and releases the same to permit it to drop down and move the contact 18a away from the contact 20. When the balance operates in a contra-direction, pallet 19b acts upon the contact 17a in the same manner to impart momentary impulse of current while the balance is approaching its position of equilibrium, but by the time it reaches its position of equilibrium the circuit is again broken.

I have hereinbefore stated, in referring to the construction thus far described, that Figs. 5 and 6 show the balance in its position of equilibrium. By this I mean its position of static equilibrium or its position of equilibrium with respect to the hair spring associated with it. It will be noted, however, that according to the laws of magnetism, the armature 25, when in the position of Figures 5 and 6, is likewise in a position of magnetic equilibrium because the poles of the armature and the poles 12 and 12a of the magnet are symmetrically disposed with respect to one another, so as to bring about a condition of minimum reluctance. Thus, in the form of the invention shown in Figures 3-7, the arrangement is such that the positions of static and magnetic equilibrium and of minimum reluctance coincide and while it is not essential that there be absolute coincision in this regard, this relation of the parts constitutes the preferred form of the invention. According to this arrangement, therefore, when the balance with its armature is in its position of static or magnetic equilibrium or in its position of minimum reluctance, the circuit to the magnet is open, and if the parts are at rest, no magnetic force is produced unless there is a remanence of the metal which is negligible for practical purposes.

However, as the balance, during operation, moves from one of its extreme positions toward the position of Figs. 5 and 6, continuously picking up speed by virtue of tension of its hair spring, it comes to an intermediate position where one of the pallets closes the switch element and causes the magnet circuit to be closed. The magnet is not fully energized simultaneously with the closing of the circuit and the magnetic flux circuit is not instantaneously produced for it requires a short interval for its establishment due chiefly to the facts of self induction and magnetic inertia of the cores. The flux circuit, however, builds up rapidly to its maximum which occurs at or about the time the balance passes through its position of magnetic equilibrium and even though the switch opens again by the time the balance reaches its position of equilibrium, the magnetic flux circuit will persist even after the opening of the switch in order to impart to the balance a magnetic impulse of sufficient duration and strength to insure its continued operation. In other words, with the structure as shown in the drawings, the actual closing of the magnet circuit is advanced with respect to the position of equilibrium for a sufficient extent to enable the flux circuit to build up sufficiently to give the proper magnetic impulse to the balance just prior to and substantially during the passage of the balance through its position of magnetic equilibrium, but to permit this flux to expend itself as shortly as possible after the passage of the balance beyond its position of magnetic equilibrium, so as not to impose a backward drag on the balance. If I were to keep the magnet circuit closed up to and through the time when the balance is passing through its position of magnetic equilibrium, shown in Figs. 5 and 6, this flux circuit would persist for a sufficient period to produce this backward drag which would be detrimental. It is for these reasons that the contacts of the magnet energizing circuit are made and broken, as shown in the accompanying drawings, and when a clockwork movement is operated, as shown in these drawings, it will operate as stated.

Figure 18:
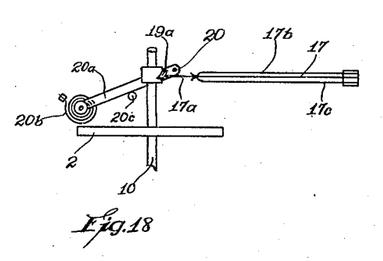
Figs. 18 and 19 show still other embodiments of the contacts arrangement.
Figure 19:
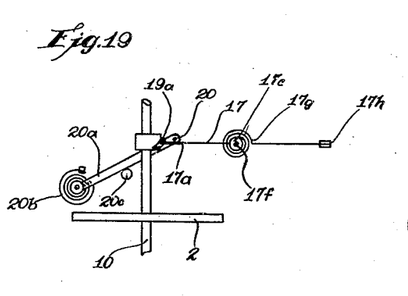

Another system of contact may advantageously be utilized (Figs. 18 and 19).

This system works in both directions, the operation being similar to that illustrated in Figs. 3 to 7.

Blade 17 (Fig. 18) is maintained between two blades 17b and 17c. Contact stud 20 is mounted on a movable lever 20a, urged by a coiled spring 20b, or through any other elastic means, against its stop 20c; The whole is insulated from the mass and is connected to one of the coils.

In this embodiment, the contact with stud 20 is produced through part 17a, the part 18a of Figs. 3, 4, 5, 6 and 7 being done away with in this case.

The operation will readily be understood as it is similar to that described with reference to Figs. 3 to 7 inclusive.

In the embodiment of Fig. 19, which is slightly different from that of Fig. 18, blades 17, 17b and 17c have been replaced by a jointed system. Blade 17 is carried by a sleeve 17c pivoting about an axis 17f; said sleeve carries a coiled spring 17g, which has its outer end fixed at 17h.

The whole of said contact 17 is connected to the mass of the clockwork.

The balance may also be kept moving in another manner through a system of contacts 18a—20 several embodiments of which are diagrammatically shown in Figs. 9, 10, 11, and 12, the closing and the opening of the electric circuit taking place through the same contacts 18a—20. Thus, referring for instance to Figs. 9, 10, 11, 12, it will be seen that the electric circuits are different but that the contact is made between stud 20 and the end 18a of flexible blade 18. The pallets 19a and 19b, shown diagrammatically in Figs. 9–12, are of the same form as those shown in Figures 3–7 inclusive.

Under the action of pallets 19a and 19b, which, in this case, act merely as cams, arm 17 moves as in the system above described and the mechanical and magnetic actions take place in the same manner as in the case of Figs. 3 to 7 inclusive.

Figure 9:
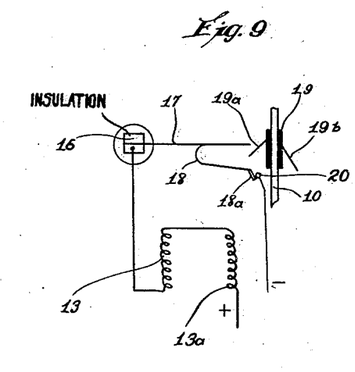
Figs. 9, 10, 11 and 12 show other embodiments of the contacts arrangement.

In the embodiment of Fig. 9, flexible arm 17 is supported by a pillar 16 insulated from the mass of the apparatus and connected with two coils 13 and 13a; sleeve 19 that carries pallets 19a and 19b is insulated from the mass of the apparatus and stud 20 is connected with said mass.

The electric circuit is the following: negative terminal, stud 20, 18a, 18, 17, 16, coils 13 and 13a, positive terminal, or the reverse.

Figure 10:
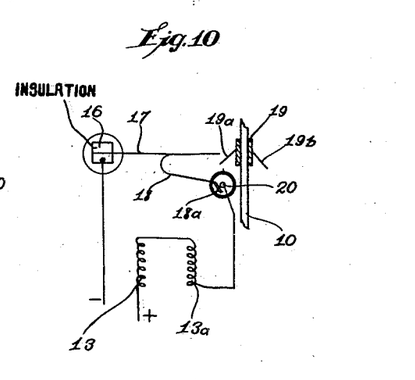

In the embodiment of Fig. 10, flexible arm 17 is supported by a pillar 16 connected to the mass of the apparatus, sleeve 19 itself is connected to the mass and stud 20 is insulated from the mass and connected with coils 13 and 13a.

The electric circuit in this case is as follows: negative terminal of the source of current, 16, 17, 18, 18a, 20, 13a, 13, positive terminal, or the reverse.

Figure 11:
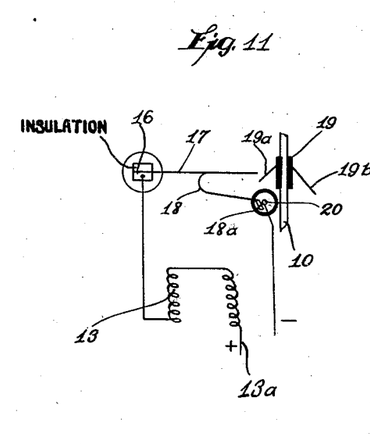

In the embodiment of Fig. 11, flexible arm 17 is supported by a pillar 16 insulated from the mass of the apparatus and connected with coils 13 and 13a (which themselves are connected with the positive terminal); sleeve 19 is insulated from the mass; stud 20 is also insulated from the mass, but it is connected to the negative terminal of the source of current.

The electric circuit is the following: negative terminal of the source of current, 20, 18a, 18, 17, 16, coils 13 and 13a and positive terminal of said source, or the reverse.

Figure 12:
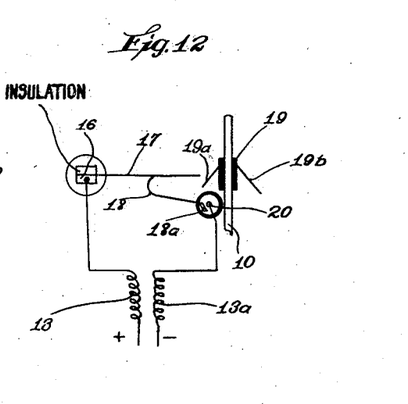

In Figure 12, flexible arm 17 is supported on pillar 16 which is insulated from the mass and connected with the positive terminal through coil 13. Sleeve 19 and stud 20 are insulated from the mass and stud 20 is connected, through coil 13a, with the negative terminal.

The electric circuit is as follows: positive terminal, coil 13, 16, 17, 18, 18a, 20, coil 13a to negative terminal.

In order to better understand the motion in the case of a timepiece according to the present invention, the embodiment of Figs. 1 and 2 will be more specifically described. The clockwork movement comprises a main supporting plate 1, made of a moulded insulating material or any other metallic material and provided with supports for balance 2 and driving wheel 4.

Balance 2 is mounted on a spindle 10, pivoted at one end on a bent part of plate 1 and at the other end in a member 22. Said spindle 10 of balance 2 carries, besides its coiled spring 24, a sleeve 19 provided with pallets 19a and 19b, which play the part of breaking contacts (case of Figs. 3, 4, 5, 6, 7, 15, 16, 17) or of cams (case of Figs. 9, 10, 11, 12, 18, 19) according to the arrangement that is utilized. Said spindle 10 further carries the means for driving ratchet wheel 4 according to the showing of Fig. 8. Said means will be hereinafter specifically described.

Figure 13:
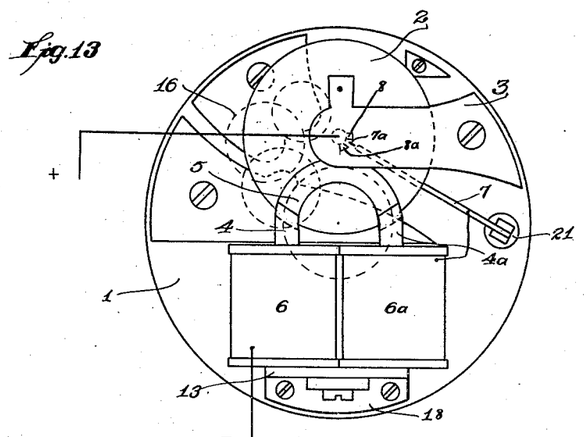
Figs. 13 and 14 show a watch mechanism according to the present invention, in elevational and in sectional view respectively.
Figure 14:
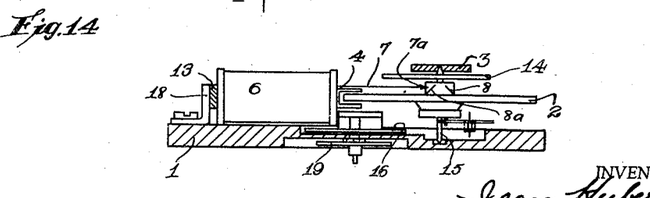

Another embodiment of my invention, which is more particularly applicable to watches, but which could also quite well be adapted to other timepieces as in the preceding examples is shown in Figs. 13 and 14. It comprises a circular balance 2 provided with an armature of soft iron 5, and two coils 6 and 6a, placed in the same plane as the balance, in such manner that in the position of equilibrium of the balance with reference to the coils armature 5 is symmetrically placed.

On the other hand, in said position of equilibrium the contacts are open and the impulses that serve to keep the balance in motion take place symmetrically or not, in one or in both directions, before the position of equilibrium.

For this purpose, the balance is provided with two pallets 8 and 8a made of a suitable metal, adapted to come into contact with the end 7a, made of a suitable metal, of a flexible blade carried by the main supporting plate of the watch and electrically insulated therefrom.

Figure 15:
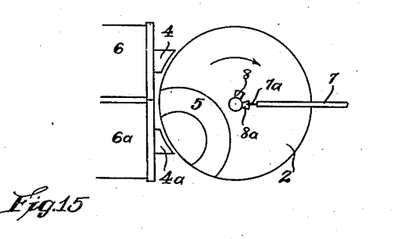
Figs. 15, 16 and 17 are diagrammatical views illustrating the operation of the device of Figs. 13 and 14.
Figure 15A:
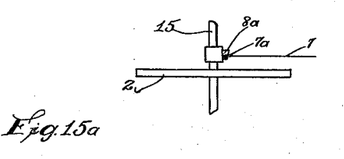
Figures 15a, 16a and 17a are side elevations of the balance and contact structures, as shown in Figures 15, 16 and 17, respectively.
Figure 15B:
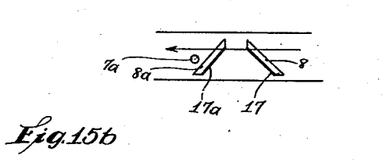
Figures 15b, 16b and 17b are fragmental development views showing the relation between the cams and spring arms of Figures 15, 16 and 17, respectively.
Figure 16:
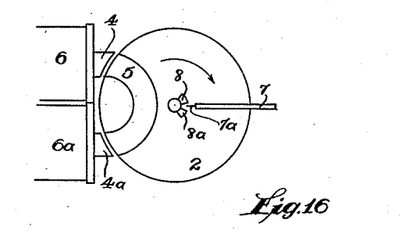
Figure 16A:
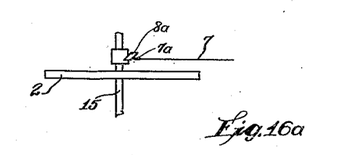
Figure 16B:
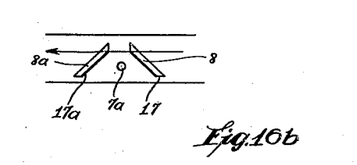
Figure 17:
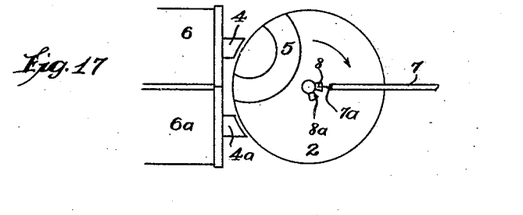
Figure 17A:
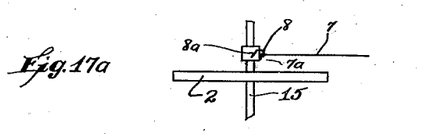
Figure 17B:
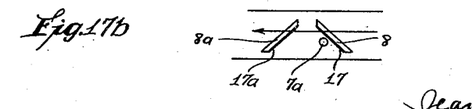

Said two pallets are inclined, as shown in Figs. 15, 16 and 17, which represent the development of pallets 8 and 8a and the end 7a of blade 7, in three different positions of the balance.

Thus, taking for instance the embodiment of Fig. 15, it will be seen that contact 7a—8a is about to be closed and that the balance moves in the direction of the arrow, its mass of iron being subjected to the action of the two coils 6—6a. The electric circuit when closed is the following: negative terminal of the source of current, coils 6 and 6a, contact 7a, contact 8a, and positive terminal of the source of current, or the reverse. During that displacement, contact 7a, carried by blade 7, moves upwardly under the action of pallet 8a, pallets 8 and 8a, carried by the balance having inclined surfaces.

When balance 2 arrives to its position of equilibrium (Fig. 16) the electric circuit is opened, contact 7a being released, and flexible blade 7 comes back to its original position.

As the balance further moves under the action of its inertia, as shown in Fig. 17, in the direction of the arrow, contact 7a is brought against the back of pallet 8, which is covered with a layer of an insulating material 17. The inclined disposition of said pallet causes the end 7a of blade 7 to move in a downward direction and to escape from pallet 8, so as to come back to its original position. During the return motion of the balance, blade 7 is given the same displacements, but is now actuated by the other pallet.

The specific construction of the clockwork movement the operation of which has just been described will be better understood from Figs. 13 and 14. The watch comprises a main supporting plate 1 provided with the same supports as in the case of ordinary watches having a mechanical movement which maintain the mechanism of movable parts 16. In Fig. 13 I have only shown their position by dotted lines, in order not to confuse the drawing. Balance 2 is mounted on a spindle 15, pivoted between plate 1 and member 3 (Fig. 14). The spindle 15 of the balance carries, besides its coiled spring 14, pallets 8 and 8a, playing the part of contacts (Figs. 15, 16, 17). Said spindle further carries the means for driving the wheelwork (Fig. 8).

All the devices for keeping the balance in motion that have been above described as working in both directions can work in only one direction by doing away with one of the two cams or pallets.

Figure 8:
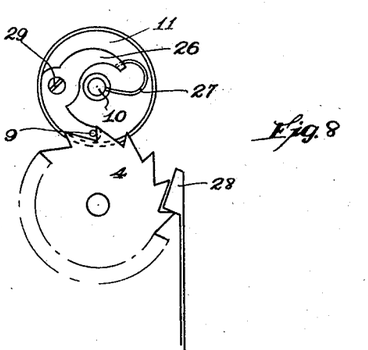
Fig. 8 shows a driving system in plan view and in sectional view.
Figure 8A:
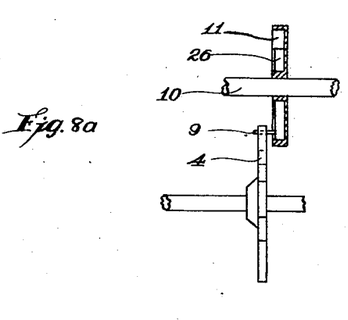
Figure 8a is an edge view of the structure of Figure 8 with the pawl mechanism shown in central section.

The driving device shown in Fig. 8 comprises a box 11 provided with a small pawl 26 fixed to a pivot screw and carrying a stud 9. Said pawl 26 is brought back into its normal position by a small spring 27. Wheel 4 is driven by stud 9 in only one direction of the oscillations of the balance. Pawl 26 is pivoted in such manner that it allows stud 9 to pass over the teeth of the ratchet wheel during the return motion of the balance. A pawl 28 serves to maintain ratchet wheel 4. Ratchet wheel 4 being thus driven, the spindle of said wheel carries an endless screw 5 (Fig. 1) or a pinion (Fig. 13) according to the needs of the reducing gear, which is of the usual arrangement.

All the contacting means that have just been described could of course be employed with a driving system different from the one described with reference to Fig. 8. For instance it would be possible to utilize a driving system of the type of metronome escapements, but with an inversed working.

Figures 20, 23:
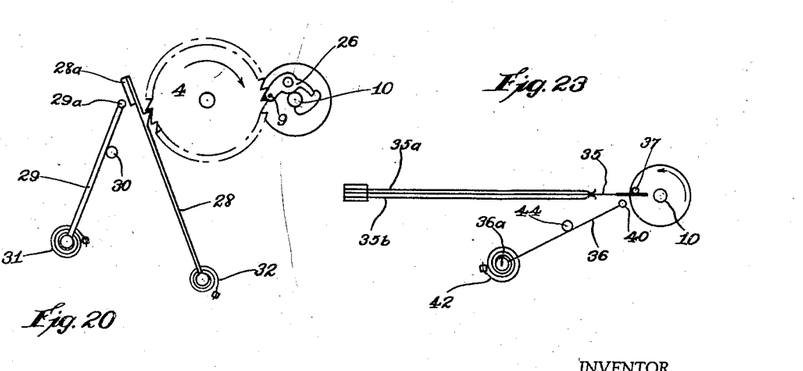
Figs. 20, 21, 22, and 23 show various embodiments of systems in which the drive and the contacts form a single device.

The system of contact in one or both directions above described (Figs. 3, 4, 5, 6, 7, 9, 10, 11, 12, 15, 16, 17, 18 and 19) and the driving system of Fig. 8 have independent functions, but the present invention also comprises watches and timepieces in which the contacting device and the driving device make a single unit. Fig. 20 shows such an arrangement.

According to the embodiment of Fig. 20, contact is produced for only one direction of the motion. For this purpose, the whole of the pawl (Fig. 8) must be keyed on the shaft 10 of a balance 2 so that stud 9 of said pawl may engage ratchet wheel 4 (Figs. 8 and 20), said stud being thus ready to impart the movement to said wheel when the iron mass 25 of balance 2 is in the position of Fig. 3, with respect to the iron core of coils 12 and 12a.

Under the action of stud 9 ratchet wheel 4 rotates in the direction of the arrow (Fig. 20) and in turn lifts a stop blade 28, which carries at its end 28a a contact made of a suitable material. Said contact 28a then closes the electric circuit through its cooperation with contact 29a carried by a pivoting arm 29 which is applied by coiled spring 31 against stud 30.

The whole of parts 29 and 30 is insulated from the mass of the apparatus and is connected to one of the two coils 13 or 13a.

When balance 2 is in the position of Fig. 6, pawl 28 has come back to its place in the interval between two adjacent teeth of ratchet wheel 4

(Fig. 20) and the circuit is open, lever 29, which carries contact 29a being stopped by stud 30.

Figure 21:
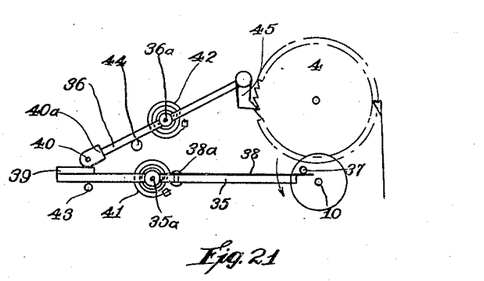

I have shown in Fig. 21 another system in which the driving device and the contacting device are combined. This system works with impulses being given in only one direction of the oscillations, and establishes the magnetic circuit through a mechanism comprising two levers jointed at 35a and 36a (Fig. 21).

The spindle 10 of the balance carries on a small disk a fixed stud 37. The latter moves in the direction of the arrow and is brought into contact with a small blade 38 riveted at its end 38a to a lever 35. Consequently lever 35 is lowered and it causes its contact piece 39 to cooperate with contact 40 mounted in an insulating manner on lever 36 and thus to close the circuit.

As stud 37 further moves in the direction of the arrow, it releases small blade 38 and lever 35 is then brought back into contact with stop 43 by its coiled spring 41, while lever 36 is brought back into contact with its stop 44 by its coiled spring 42, as shown by Fig. 21.

The balance in turn brings back stud 37 to its original position, said stud meeting, in the course of this movement blade 38, which, being very flexible is lifted by the stud without actuating its lever 35.

In order that the device may operate properly, stud 37 must be keyed on the spindle of the balance in such manner that being in its operative position as shown in Fig. 21, the iron 25 of balance 2 is in the position of Fig. 3 with respect to the iron elements of coils 13 and 13a.

The wheelwork can be pushed by a pawl 45 placed at one of the ends of levers 35 or 36 (Fig. 21). By way of example, in Fig. 21, pawl 45 has been placed at one end of lever 36.

Figure 22:
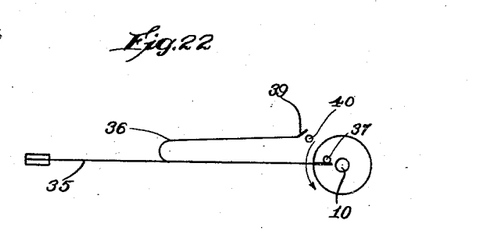

Figs. 22 and 23 show variations of the embodiment of Fig. 21.

In Fig. 22, arm 35 is a flexible leaf spring anchored to a firm support at its left hand end. It carries a branch arm 36 having a contact 39 to cooperate with fixed contact 40. The stud 37 is carried by shaft 10 and rotates in an arc defined by the arrow to bend down blade 35 and engage contact 39 with contact 40 to close the circuit. As the stud continues to move, it releases the blade 35 which springs up and breaks the circuit. On the reverse movement of the stud 37, the blade 35 yields to permit it to pass by.

In Fig. 23, the blade 35 is held between auxiliary blades 35a and 35b. Part 36 is in the form of an arm pivoted at 36a and yieldably impelled against stop 44 by spring 42. Stud 37 is carried by shaft 10 and rotates in one direction to engage blade 35 with contact 40 to close the circuit. When 37 releases blade 35, the inherent resiliency of the latter returns it to the position shown in Fig. 23 and thus breaks the circuit.

According to the embodiment of Figs. 1 and 2 the electro-magnet consists of two coils 13 and 13a having iron cores 12 and 12a respectively and provided with suitable windings. Iron cores 12 and 12a are connected together by a yoke 30, also made of iron, which also serves to attach the electro-magnet to the main suporting plate 1.

The cores of coils 13 and 13a, yoke 30 and the armature 25 of the balance can be made at will, wholly or partly, of pieces of soft iron, as stated in the above description, or of permanent magnets.

Referring to Fig. 13, it will be seen that the electro-magnet consists of two coils 6 and 6a having flat cores 4 and 4a respectively, which are connected by a yoke 19 made of soft iron which also serves for the fixation of the electromagnet to plate 1 through member 18.

Figure 24:
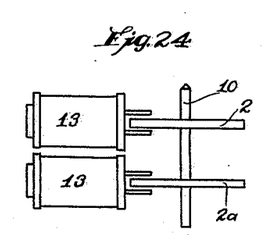
Fig. 24 shows another embodiment of the clockwork movement, including two balances.
Figure 25:
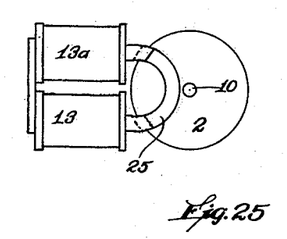
Figure 25 is a plan view of the structure of Figure 24.

In Figs. 24 and 25 I have shown another embodiment particularly intended to be used in connection with big clocks which comprises two balances 2 mounted on a common shaft 10 and having respectively each its couple of coils 13 and 13a fed through one or several contacts. Of course the invention is not limited to the case of only two balances as in the embodiment of Figs. 24 and 25.

While I have disclosed in the foregoing description what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a clockwork movement of the character described, the combination of a circular balance of non-magnetic metal, a coiled spring operatively connected to the balance, a mass of magnetic metal carried by the balance and shaped to form two magnetic poles at substantially 90 degrees to one another and located at the periphery of the balance, an electromagnet embodying coils and associated cores, the latter of which are positioned to be juxtaposed with the magnetic poles of said mass when the balance is in a position of equilibrium, an electric circuit for energizing said magnet, and current switching means included in said circuit and operable upon oscillation of the balance to open and close said circuit in predetermined timed relation with the movements of the balance, said current switching means maintaining said circuit open when the balance is in its position of equilibrium.

2. In a clockwork movement of the character described, the combination of a circular balance of non-magnetic metal, a coiled spring operatively connected to the balance, a mass of magnetic metal carried by the balance and shaped to form two magnetic poles at substantially 90 degrees to one another and located at the periphery of the balance, an electromagnet embodying coils and associated cores, the latter of which are positioned to be juxtaposed with the magnetic poles of said mass when the balance is in a position of equilibrium, an electric circuit for energizing said magnet, and current switching means included in said circuit and comprising a pair of oppositely inclined pallets movable with and about the axis of the balance, fixed and movable contact members included in said circuit and the movable one of which projects into the path of said pallets to be controlled thereby and move into and out of engagement with the fixed contact member as the pallets move with the balance.

3. In a clockwork movement of the character described, the combination of a circular balance of non-magnetic metal, a coiled spring operatively connected to the balance, a mass of magnetic metal carried by the balance and shaped to form two magnetic poles at substantially 90 degrees to one another and located at the periphery of the balance, an electromagnet embodying coils and associated cores, the latter of which are positioned to be juxtaposed with the magnetic poles of said mass when the balance is in a position of equilibrium, an electric circuit for energizing said magnet, and current switching means included in said circuit and comprising two oppositely inclined pallets movable with and coaxial of the balance, two flexible contacts, one of which is relatively fixed and the other of which is movable, said contacts being included in said circuit and normally free from engagement with one another, the movable contact being positioned to cooperate with the pallets and to be periodically movable thereby into engagement with the fixed contact when the pallets move with the balance, said pallets being so positioned with respect to the balance that the circuit is open when the balance is in its position of equilibrium.

4. In a clockwork movement of the character described, the combination of a spindle mounted to oscillate, a balance carried by said spindle and of non-magnetic material, a coiled spring connected to the spindle, a mass of magnetic metal carried by the balance, an electromagnet juxtaposed with the balance for imparting impulses thereto when the magnet is energized, a circuit including said magnet, fixed and movable contacts included in said circuit, the movable contact projecting into proximity with the spindle, and a pair of oppositely inclined pallets mounted on the spindle and adapted through the oscillation thereof to engage with and shift the movable contact into engagement with the fixed contact in predetermined timed relation to the oscillations of the balance to periodically close said circuit.

5. In a clockwork movement of the character described, the combination of a spindle, a magnetically responsive balance mounted on the spindle, a magnet juxtaposed to the balance and adapted to be periodically energized to impart magnetic operating impulses to the balance, a circuit including said magnet, fixed and movable contacts also included in said circuit, with the movable contact positioned to extend into proximity with the spindle, a pair of oppositely inclined pallets carried by the spindle and extending to alternately engage with the movable contact as the spindle oscillates to alternately shift said movable contact into engagement with the fixed contact for the purpose of alternately completing said circuit in timed relation to the oscillations of the balance.

6. In a clockwork movement of the character described, the combination of a spindle, a magnetically responsive balance mounted on the spindle, a magnet juxtaposed to the balance and adapted to be periodically energized to impart magnetic operating impulses to the balance, a circuit including said magnet, current switching means also included in said circuit and comprising a yieldable fixed contact, and a yieldable movable contact, the latter of which extends into proximity with the spindle, and a pair of oppositely inclined pallets carried by the spindle and projecting into positions to alternately engage with the movable contact as the spindle is oscillated to alternately shift the movable contact into engagement with the fixed contact for the purpose of completing the circuit in timed relation to oscillations of the balance.

7. In a clockwork movement of the character described, the combination of a spindle mounted to oscillate, a circular oscillating balance of non-magnetic material keyed to the spindle, a mass of magnetic metal carried by the balance and shaped to provide two magnetic poles at substantially 90 degrees to one another at the periphery of the balance, a coiled spring connected to the spindle normally tending to move the balance into a position of equilibrium, an electromagnet embodying a pair of coils and cooperating cores, the latter of which are located to be juxtaposed with the magnetic poles of the balance when the balance is in a position of equilibrium, an electric circuit including the coils of said magnet, cooperating fixed and movable contacts in said circuit, the fixed contact comprising a yieldable member normally impelled into a predetermined position and the movable contact also embodying a yieldable member normally free from engagement with the fixed contact and projecting into proximity with the spindle, and a pair of oppositely inclined pallets carried by the spindle and projecting to periodically and alternately engage with the movable contact as the spindle is oscillated to alternately shift the movable contact into engagement with the fixed contact, said pallets being so positioned with respect to the magnetic mass on the balance that said contacts are free from engagement with one another and the electric circuit open when the balance is in its position of equilibrium.

8. In a clockwork movement of the character described, the combination of a spindle mounted to oscillate, a circular oscillating balance of non-magnetic material keyed to the spindle, a mass of magnetic metal carried by the balance and shaped to provide two magnetic poles at substantially 90 degrees to one another at the periphery of the balance, a coiled spring connected to the spindle normally tending to move the balance into a position of equilibrium, an electromagnet embodying a pair of coils and cooperating cores, the latter of which are located to be juxtaposed with the magnetic poles of the balance when the balance is in a position of equilibrium, an electric circuit including the coils of said magnet, cooperating fixed and movable contacts in said circuit, the fixed contact comprising a yieldable member normally impelled into a predetermined position, a stop for limiting the fixed contact to such position, and the movable contact also comprising a yieldable member normally free from engagement with the fixed contact, and operating means movable with the balance to periodically force the yieldable movable contact member into engagement with the yieldable fixed contact member to periodically energize the magnet for the purpose of sustaining the oscillations of the balance.

9. In a clockwork movement of the character described, the combination of an electromagnet, a circular balance of non-magnetic metal mounted for oscillation in proximity to the magnet, a magnetic mass movable with said balance and constituting the armature of the magnet, a switch, an electric circuit including said magnet and switch, and means movable with the balance to periodically close said switch to periodically energize the magnet, said means being inoperative to close the switch when the balance is in its position of equilibrium but operative to momentarily close said switch as the balance approaches its position of equilibrium during oscillation of the balance in at least one direction.

10. In a clockwork movement of the character described, the combination of an electromagnet, a circular balance of non-magnetic metal mounted for oscillation in proximity to the magnet, a magnetic mass movable with said balance and constituting the armature of the magnet, a switch, an electric circuit including said magnet and switch, and means movable with the balance to periodically close said switch to periodically energize the magnet, said means being inoperative to close the switch when the balance is in its position of equilibrium but operative to momentarily close said switch as the balance approaches its position of equilibrium in each direction during oscillation of the balance.

11. In a clockwork movement of the character described, the combination of an electromagnet, a circular balance of non-magnetic metal mounted for oscillation in proximity to the magnet, a magnetic mass movable with said balance and constituting the armature of the magnet, a switch, an electric circuit including said magnet and switch, and means movable with the balance to periodically close said switch to periodically energize the magnet, said means being inoperative to close the switch when the balance is in its position of equilibrium but operative to momentarily close said switch as the balance approaches its position of equilibrium in each direction during oscillation of the balance and symmetrically with respect to said position of equilibrium of the balance.

12. In a clockwork movement of the character described, the combination of a spindle mounted to oscillate, a balance carried by said spindle and of non-magnetic material, a coiled spring connected to the spindle, a mass of magnetic metal movable with the balance, an electromagnet juxtaposed with the balance for imparting impulses thereto when the magnet is energized, a circuit including said magnet, fixed and movable contacts included in said circuit, the movable contact projecting into proximity with the spindle and normally resiliently spaced from the fixed contact, and a pair of oppositely inclined pallets carried by the spindle and arcuately spaced apart with respect to one another and each of which is adapted, as the balance oscillates in one predetermined direction toward the position of magnetic equilibrium of said mass, to engage with and move the movable contact into engagement with the fixed contact and to release the movable contact for separation from the fixed contact as the balance nears said position of equilibrium.

13. In a clockwork movement of the character described, the combination of a magnetically responsive balance, a magnet juxtaposed to the balance and adapted to be periodically energized to impart magnetic operating impulses to the balance, a circuit including said magnet and a switch embodying a yieldable current switching device and a pair of switch members movable with the balance and positioned on opposite sides of and spaced from the yieldable current switching device when the balance is in its position of magnetic equilibrium to assure an open circuit when the balance is in such position, said switching device being adapted to respectively engage with said switch members when the balance approaches its position of magnetic equilibrium during oscillatory movement of the balance, to periodically operate said switch and correspondingly energize said circuit.

14. In a clockwork movement of the character described, the combination of a circular balance of non-magnetic metal, a coiled spring operatively connected to the balance, a mass of magnetic metal movable with the balance and shaped to form two magnetic poles at substantially 90 degrees to one another and located at the periphery of the balance, an electromagnet embodying coils and associated cores, the latter of which are positioned to cooperate with said mass of magnetic material, whereby said mass serves as the armature of the magnet, an electric circuit for energizing said magnet, and current switching means included in said circuit and comprising a pair of oppositely inclined pallets movable with and about the axis of the balance, fixed and movable contact members included in said circuit and the movable one of which projects into the path of said pallets to be controlled thereby and move into and out of engagement with the fixed contact member as the pallets move with the balance.

15. In a clockwork movement of the character described, the combination of a frame, a spindle supported thereon, a magnetically operable balance on the spindle, an electromagnet in proximity to the balance to impart, when energized, magnetic impulses thereto, an electric circuit including said magnet, at least one inclined pallet carried by said spindle, a stationary contact carried by the frame and included in said circuit, an arm movably supported by the frame and one end of which is positioned to cooperate with said pallet, a flexible blade supported by the arm, and a contact at the end of the flexible blade also included in said circuit and adapted to cooperate with the stationary contact for closing said circuit, the pallet being so disposed that said circuit is open when the balance passes through its position of equilibrium.

16. In a clockwork movement of the character described, the combination of a frame, a spindle supported thereon, a magnetically operable balance on the spindle, an electromagnet in proximity to the balance to impart, when energized, magnetic impulses thereto, an electric circuit including said magnet, at least one inclined pallet carried by the spindle and included in said circuit, a stationary contact also included in said circuit, and a current carrying bridge normally free from engagement with the stationary contact and movable into engagement therewith, said bridge projecting into the path of said pallet to be moved thereby into engagement with the stationary contact to energize the magnet, said pallet being so disposed that said circuit is open when the balance passes through its position of equilibrium.

17. In a clockwork movement of the character described, the combination of a frame, a spindle supported thereon, a magnetically operable balance on the spindle, an electromagnet in proximity to the balance to impart, when energized, magnetic impulses thereto, an electric circuit including said magnet, at least one inclined pallet carried by the spindle, a stationary contact also included in said circuit, and a current carrying bridge included in said circuit and normally free from engagement with the stationary contact and movable into engagement therewith, said bridge projecting into the path of said pallet to be moved thereby into engagement with the stationary contact to energize the magnet, said pallet being insulated from said circuit and being so disposed that said circuit is open when the balance passes through its position of equilibrium.

18. In a clockwork movement of the character described, a magnetically operable balance, an electromagnet for operating said balance, a circuit including said magnet, and means controlled by the oscillation of the balance to periodically make and break said circuit, said means including an arm provided intermediate its ends with a spiral spring to resiliently connect the opposite end sections of the arm.

19. In a clockwork system including an electric circuit, a device for controlling said circuit which comprises, in combination, an elastically mounted contact in said circuit, another elastically mounted contact in said circuit adapted to cooperate with said first mentioned contact for closing said circuit, an oscillating spindle actuated by said clockwork system, and two inclined pallets rigid with said spindle and adapted to act on said second mentioned contact for each oscillation of said spindle in either direction respectively.

20. In a clockwork system including an electric circuit, a device for controlling said circuit which comprises, in combination, two contacts included in said circuit and at least one of which is elastically mounted for engagement with and disengagement from the other to close and open the circuit, an oscillating spindle actuated by said clockwork, and two camming members having inclined surfaces and rigid with said spindle and adapted to consecutively act on the elastically mounted contact for each oscillation of the spindle in each direction.

21. In a clockwork system including an electric circuit, a device for controlling said circuit which comprises, in combination, two contacts included in said circuit and at least one of which is elastically mounted for engagement with and disengagement from the other to close and open the circuit, an oscillating spindle actuated by said clockwork, and at least one camming member having an inclined surface and rigid with said spindle and adapted to act on the elastically mounted contact to periodically engage said contacts, said camming member being so positioned with respect to the elastically mounted contact that it will engage the contacts with one another while the spindle is approaching its position of equilibrium and permit disengagement of said contacts before the spindle has passed its position of equilibrium.

22. In a clockwork movement, the combination of an oscillatory balance having an electromagnet armature movable therewith, an electromagnet mounted in proximity to the balance, a circuit including said electromagnet, and circuit closing means included in said circuit and operatively connected with the balance to close said circuit as the armature is moving toward a position of equilibrium in both directions of oscillation of the balance and to open said circuit when the armature is in a position of equilibrium.

23. In a clockwork movement, the combination of an electromagnet, a circular balance of non-magnetic material mounted for oscillation in proximity to the magnet, a magnetic mass movable with the balance and constituting the armature of the magnet, a switch, and an electric circuit including said magnet and switch, said switch including means movable with the balance to periodically close said circuit to periodically energize the magnet, said means being inoperative to close the circuit when the balance is in its position of equilibrium, but operative to momentarily close said circuit as the balance approaches its position of equilibrium during oscillation of the balance in at least one direction.

24. In a clockwork movement, the combination of a spindle mounted to oscillate, an oscillating balance of non-magnetic material on said spindle, a mass of magnetic metal movable with the balance and shaped to provide spaced apart magnetic poles, a coiled spring connected to the spindle and normally tending to move the balance into a position of equilibrium, an electromagnet having spaced apart terminals, located to be juxtaposed with the magnet poles of said mass when the balance is in a position of equilibrium, an electric circuit including said electromagnet, cooperating fixed and movable contacts in said circuit, the movable contact comprising a yieldable member normally free from engagement with the fixed contact, and operating means movable with the balance to periodically force the yieldable movable contact member into engagement with the fixed contact member to periodically energize the magnet for the purpose of sustaining the oscillations of the balance.

25. In a clockwork system including an electric circuit, a device for controlling said circuit which comprises, in combination, a relatively fixed contact, a relatively movable contact elastically mounted and normally impelled away from the fixed contact, a stop positioned to be engaged by the movable contact to determine the normal spacing between said contacts, and means for shifting the movable contact into engagement with the fixed contact, including an oscillating spindle actuated by said clockwork system, and two inclined pallets rigid with said spindle and adapted to move said movable contact into engagement with the fixed contact for each oscillation of the spindle in either direction respectively.

JEAN HUBERT.